(12) United States Patent
Mizutani

(10) Patent No.: US 9,279,981 B2
(45) Date of Patent: *Mar. 8, 2016

(54) LIGHT DEFLECTOR, OPTICAL SCANNING DEVICE AND IMAGE FORMING APPARATUS

(71) Applicant: KYOCERA Document Solutions Inc., Osaka-shi, Osaka (JP)

(72) Inventor: Hideji Mizutani, Osaka (JP)

(73) Assignee: KYOCERA Document Solutions Inc. (JP)

( * ) Notice: Subject to any disclaimer, the term of this patent is extended or adjusted under 35 U.S.C. 154(b) by 51 days.

This patent is subject to a terminal disclaimer.

(21) Appl. No.: 14/290,001

(22) Filed: May 29, 2014

(65) Prior Publication Data

US 2014/0355091 A1 Dec. 4, 2014

(30) Foreign Application Priority Data

May 31, 2013 (JP) ................................. 2013-115464

(51) Int. Cl.
| | |
|---|---|
| *B41J 2/385* | (2006.01) |
| *G03G 13/04* | (2006.01) |
| *G02B 26/10* | (2006.01) |
| *G02B 26/08* | (2006.01) |
| *G02B 26/12* | (2006.01) |

(52) U.S. Cl.
CPC .......... *G02B 26/105* (2013.01); *G02B 26/0858* (2013.01); *G02B 26/125* (2013.01)

(58) Field of Classification Search
None
See application file for complete search history.

(56) References Cited

U.S. PATENT DOCUMENTS

| | | | | |
|---|---|---|---|---|
| 2003/0016428 | A1* | 1/2003 | Kato et al. | ..................... 359/226 |
| 2003/0053156 | A1 | 3/2003 | Satoh et al. | |
| 2009/0290205 | A1 | 11/2009 | Satoh et al. | |
| 2010/0195180 | A1* | 8/2010 | Akanuma et al. | .......... 359/200.8 |

FOREIGN PATENT DOCUMENTS

| | | |
|---|---|---|
| JP | H07-092409 | 4/1995 |
| JP | H11-305162 | 11/1999 |
| JP | 2003-172897 | 6/2003 |
| JP | 2006-071678 | 3/2006 |

(Continued)

OTHER PUBLICATIONS

Japanese Patent Appl. No. 2013-115464—Office Action issued Jul. 28, 2015.

*Primary Examiner* — Erica Lin
(74) *Attorney, Agent, or Firm* — Gerald E. Hespos; Michael J. Porco; Matthew T. Hespos

(57) ABSTRACT

A light deflector includes a fixing portion, a movable portion and a reinforcing member. The movable portion includes a mirror portion for deflecting light by swinging about a predetermined swing axis, a torsion bar fixedly supported on the fixing portion and having an axis serving as the swing axis, and a supporting body configured to support the mirror portion and fixed to the torsion bar. The supporting body includes a contact surface to be held in contact with the mirror portion and a non-contact surface opposite to the contact surface. The reinforcing member is provided only on the non-contact surface out of the contact surface and the non-contact surface of the supporting body and reinforces the supporting body and adjusts a center of gravity of the movable portion so that the center of gravity of the movable portion is located on the axis.

8 Claims, 10 Drawing Sheets

(56) References Cited

FOREIGN PATENT DOCUMENTS

| JP | 2010-54944 | 3/2010 |
| JP | 2010-128116 | 6/2010 |
| JP | 2012-083436 | 4/2012 |
| JP | 2012-198298 | 10/2012 |

* cited by examiner

LIGHT DEFLECTOR, OPTICAL SCANNING DEVICE AND IMAGE FORMING APPARATUS

This application is based on Japanese Patent Application No. 2013-115464 filed with the Japan Patent Office on May 31, 2013, the contents of which are hereby incorporated by reference.

BACKGROUND

The present disclosure relates to a light deflector used in forming an electrostatic latent image and the like, and an optical scanning device and an image forming apparatus with such a light deflector.

In an electrophotographic image forming apparatus, a light beam modulated in accordance with image data is generated, reflected and deflected, whereby an image bearing member such as a photoconductive drum is scanned with the deflected light beam to form an electrostatic latent image. The light deflector is a device for reflecting and deflecting a light beam. A technique using a MEMS (Micro Electro Mechanical Systems) mirror as a light deflector instead of a polygon mirror has been proposed. The MEMS mirror has an advantage of speeded-up scanning, low power consumption and the like.

The light deflector using the MEMS mirror includes a torsion bar, a mirror portion swingable about an axis of the torsion bar and mirror drivers. The mirror portion and the torsion bar are resonated by the mirror drivers and a light beam incident on the mirror portion is scanned by being reflected and deflected in this state.

When the mirror portion is swung about the axis of the torsion bar, an acting moment of inertia is larger on opposite ends of the mirror portion than in a center of the mirror portion in a direction intersecting with the torsion bar. Thus, the mirror portion may be bended when being swung. A light deflector provided with ribs has been proposed to suppress this bend.

This light deflector is provided with a vibrating system composed of a plate-like movable portion, a reflection film formed on the movable portion to reflect light, a first shaft member for supporting the movable portion swingably about an X-axis relative to a supporting member and ribs arranged on the movable portion, and a driving system for swinging the movable portion relative to the supporting member. The ribs are so arranged on one and the other surfaces of the movable portion that a moment of inertia on the one surface and that on the other surface are equal with respect to the first shaft member.

In this light deflector, the ribs are respectively arranged on the one and the other surfaces of the movable portion so that the moment of inertia on the one surface of the movable portion and that on the other surface are equal with respect to the first shaft member (torsion bar). This suppresses movements (e.g. vertical movements) of the movable portion formed with the reflection film other than swinging movements about the first shaft member when the movable portion (mirror portion) formed with the reflection film is swung.

SUMMARY

A light deflector according to a first aspect of the present disclosure includes a fixing portion, a movable portion and a reinforcing member. The movable portion includes a mirror portion for deflecting light by swinging about a predetermined swing axis, a torsion bar fixedly supported on the fixing portion and having an axis serving as the swing axis, and a supporting body configured to support the mirror portion and fixed to the torsion bar. The supporting body includes a contact surface to be held in contact with the mirror portion and a non-contact surface opposite to the contact surface. The reinforcing member is provided only on the non-contact surface out of the contact surface and the non-contact surface of the supporting body and reinforces the supporting body and adjusts a center of gravity of the movable portion so that the center of gravity of the movable portion is located on the axis.

An optical scanning device according to a second aspect of the present disclosure includes the above light deflector and a light source configured to irradiate a light beam to the mirror portion.

An image forming apparatus according to a third aspect of the present disclosure includes an image bearing member, the above optical scanning device and a developing unit. The optical scanning device forms an electrostatic latent image of an image represented by image data on the image bearing member. The developing unit develops the electrostatic latent image formed on the image bearing member.

These and other objects, features and advantages of the present disclosure will become more apparent upon reading the following detailed description along with the accompanying drawings.

DETAILED DESCRIPTION

Figure 1:
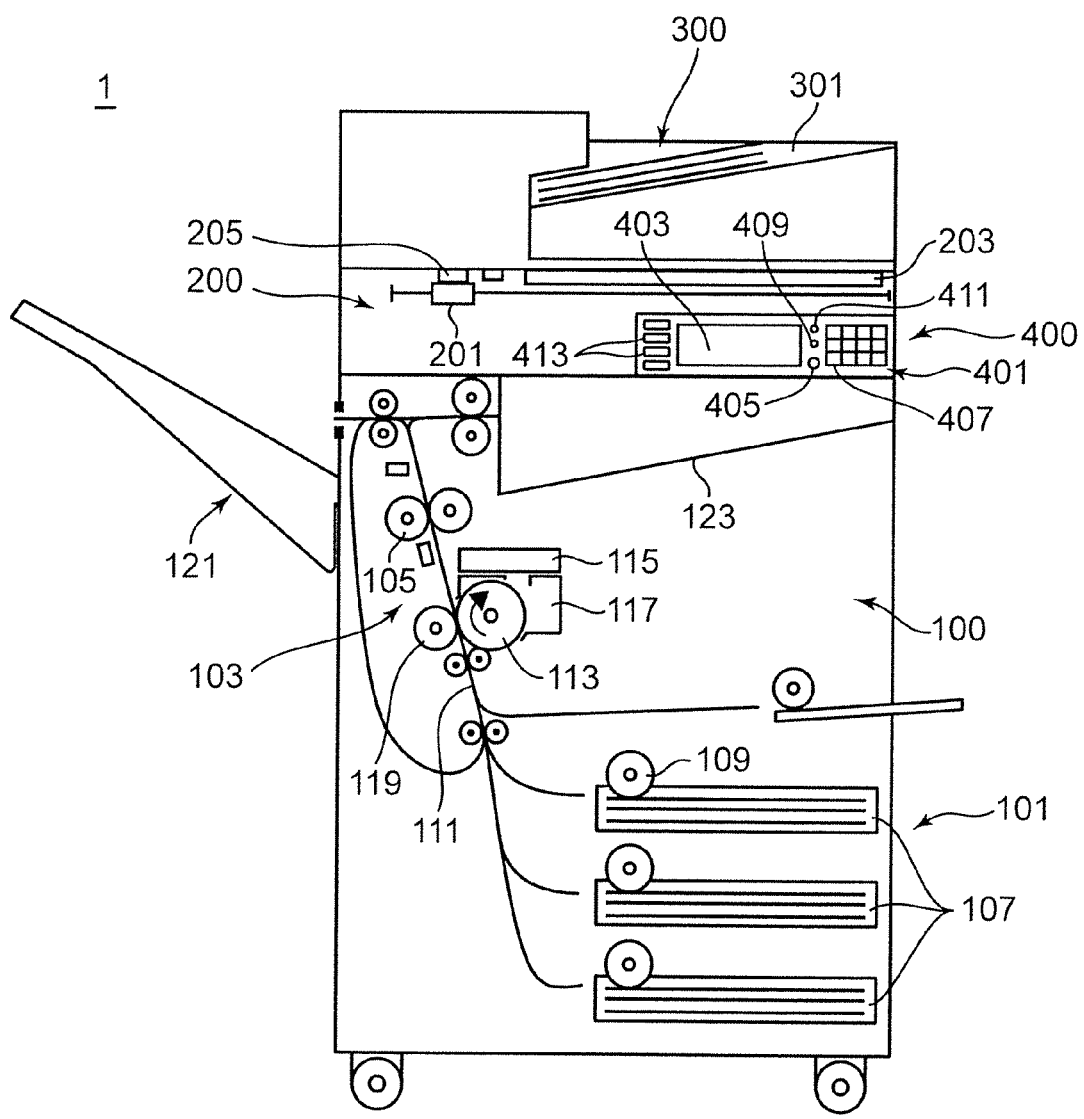
FIG. 1 is a diagram schematically showing an internal structure of an image forming apparatus to which a light deflector according to an embodiment is applied.

Hereinafter, an embodiment of the present disclosure is described based on the drawings. FIG. 1 is a diagram schematically showing an internal structure of an image forming apparatus 1 to which a light deflector according to the embodiment is applied. The image forming apparatus 1 can be, for example, applied to a digital complex machine having copier, printer, scanner and facsimile functions. The image forming apparatus 1 includes an apparatus main body 100, a document reading unit 200 arranged atop the apparatus main body 100, a document feeding unit 300 arranged atop the document reading unit 200 and an operation unit 400 arranged on the front surface of an upper part of the apparatus main body 100.

The document feeding unit 300 functions as an automatic document feeder and can successively feed a plurality of documents placed on a document placing portion 301 to the document reading unit 200.

The document reading unit 200 includes a carriage 201 carrying an exposure lamp and the like, a document platen 203 made of a transparent material such as glass, an unillustrated CCD (Charge Coupled Device) sensor and a document reading slit 205. In the case of reading a document placed on the document platen 203, the document is read by the CCD sensor while the carriage 201 is moved in a longitudinal direction of the document platen 203. Contrary to this, in the case of reading a document fed from the document feeding unit 300, the carriage 201 is moved to a position facing the document reading slit 205 and the document fed from the document feeding unit 300 is read by the CCD sensor through the document reading slit 205. The CCD sensor outputs an image of the read document as image data.

The apparatus main body 100 includes a sheet storing unit 101, an image forming unit 103 and a fixing unit 105. The sheet storing unit 101 is arranged in a lowest part of the apparatus main body 100 and includes sheet cassettes 107 capable of storing a stack of sheets. The uppermost sheet of the stack of sheets stored in the sheet cassette 107 is fed to a sheet conveyance path 111 by driving a pickup roller 109. The sheet is conveyed to the image forming unit 103 through the sheet conveyance path 111.

The image forming unit 103 forms a toner image on a sheet conveyed thereto. The image forming unit 103 includes a photoconductive drum 113 (an example of an image bearing member), an optical scanning device 115, a developing unit 117 and a transfer unit 119. The optical scanning device 115 generates light modulated in accordance with image data (image data output from the document reading unit 200, image data transmitted from a personal computer, facsimile-received image data or the like) and irradiates the light to the peripheral surface of the uniformly charged photoconductive drum 113. This causes an electrostatic latent image corresponding to the image data to be formed on the peripheral surface of the photoconductive drum 113. In this state, toner is supplied from the developing unit 117 to the peripheral surface of the photoconductive drum 113, whereby a toner image corresponding to the image data is formed on the peripheral surface. This toner image is transferred to a sheet conveyed from the sheet storing unit 101 described above by the transfer unit 119.

The sheet having the toner image transferred thereto is conveyed to the fixing unit 105. In the fixing unit 105, heat and pressure are applied to the toner image and the sheet to fix the toner image to the sheet. The sheet is discharged to a stack tray 121 or a sheet discharge tray 123.

The operation unit 400 includes an operation key unit 401 and a display unit 403. The display unit 403 has a touch panel function and displays a screen including soft keys. A user makes settings necessary to perform a function such as a copy function by operating the soft keys while viewing the screen.

The operation key unit 401 includes operation keys which are hard keys, specifically a start key 405, a numerical keypad 407, a stop key 409, a reset key 411, function changeover keys 413 for switching the function among copier, printer, scanner and facsimile functions and the like.

The start key 405 is a key for starting an operation such as copying or facsimile transmission. The numerical keypad 407 is a keypad for entering numbers such as the number of copies and facsimile numbers. The stop key 409 is a key for stopping a copying operation and the like on the way. The reset key 411 is a key for returning the set content to an initial setting state.

The function changeover keys 413 are keys including a copy key, a transmit key and the like and configured to switch a copy function, a transmit function and the like from one to another. If the copy key is operated, an initial screen for copying is displayed on the display unit 403. If the transmit key is operated, an initial screen for facsimile transmission and mail transmission is displayed on the display unit 403.

Figure 2:
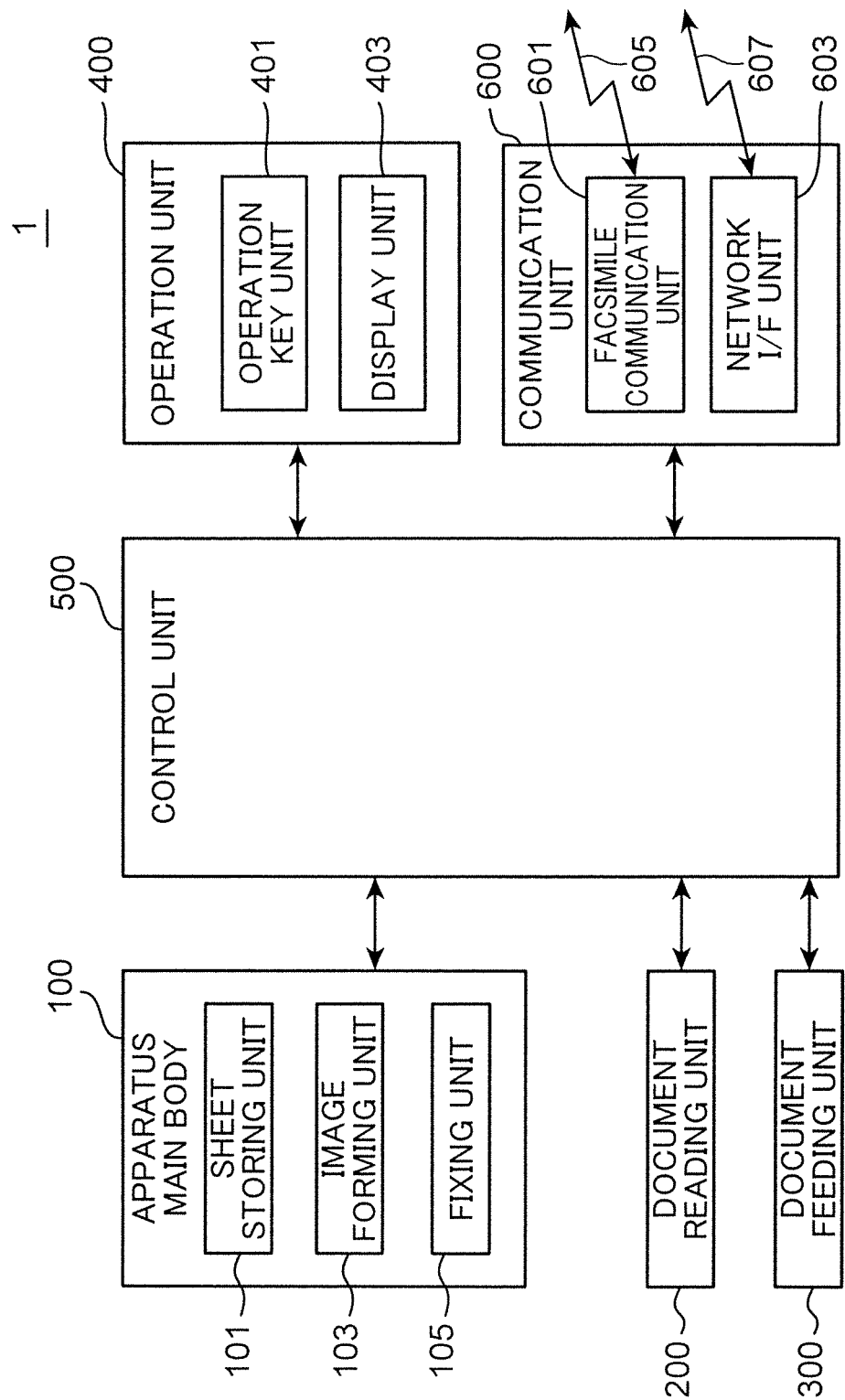
FIG. 2 is a block diagram showing the configuration of the image forming apparatus shown in FIG. 1.

FIG. 2 is a block diagram showing the configuration of the image forming apparatus 1 shown in FIG. 1. The image forming apparatus 1 is so configured that the document reading unit 200, the document feeding unit 300, the operation unit 400, a control unit 500 and a communication unit 600 are connected to each other by a bus. The apparatus main body 100, the document reading unit 200, the document feeding unit 300 and the operation unit 400 are not described since being already described.

The control unit 500 includes a CPU (Central Processing Unit), a ROM (Read Only Memory), a RAM (Random Access Memory), an image memory and the like. The CPU executes a control necessary to operate the image forming apparatus 1 on the above constituent elements of the image forming apparatus 1 such as the apparatus main body 100. The ROM stores software necessary to control the operation of the image forming apparatus 1. The RAM is used such as to temporarily store data generated during the execution of the software and store application software. The image memory temporarily stores image data (image data output from the document reading unit 200, image data transmitted from a personal computer, facsimile-received image data or the like).

The communication unit 600 includes a facsimile communication unit 601 and a network I/F unit 603. The facsimile communication unit 601 includes an NCU (Network Control Unit) for controlling a telephone line connection with a destination facsimile machine and a modulation/demodulation circuit for modulating/demodulating a signal for facsimile communication. The facsimile communication unit 601 is connected to a telephone line 605.

The network I/F unit 603 is connected to a LAN (Local Area Network) 607. The network I/F unit 603 is a communication interface circuit for carrying out communication with terminal units such as personal computers connected to the LAN 607.

Figure 3:
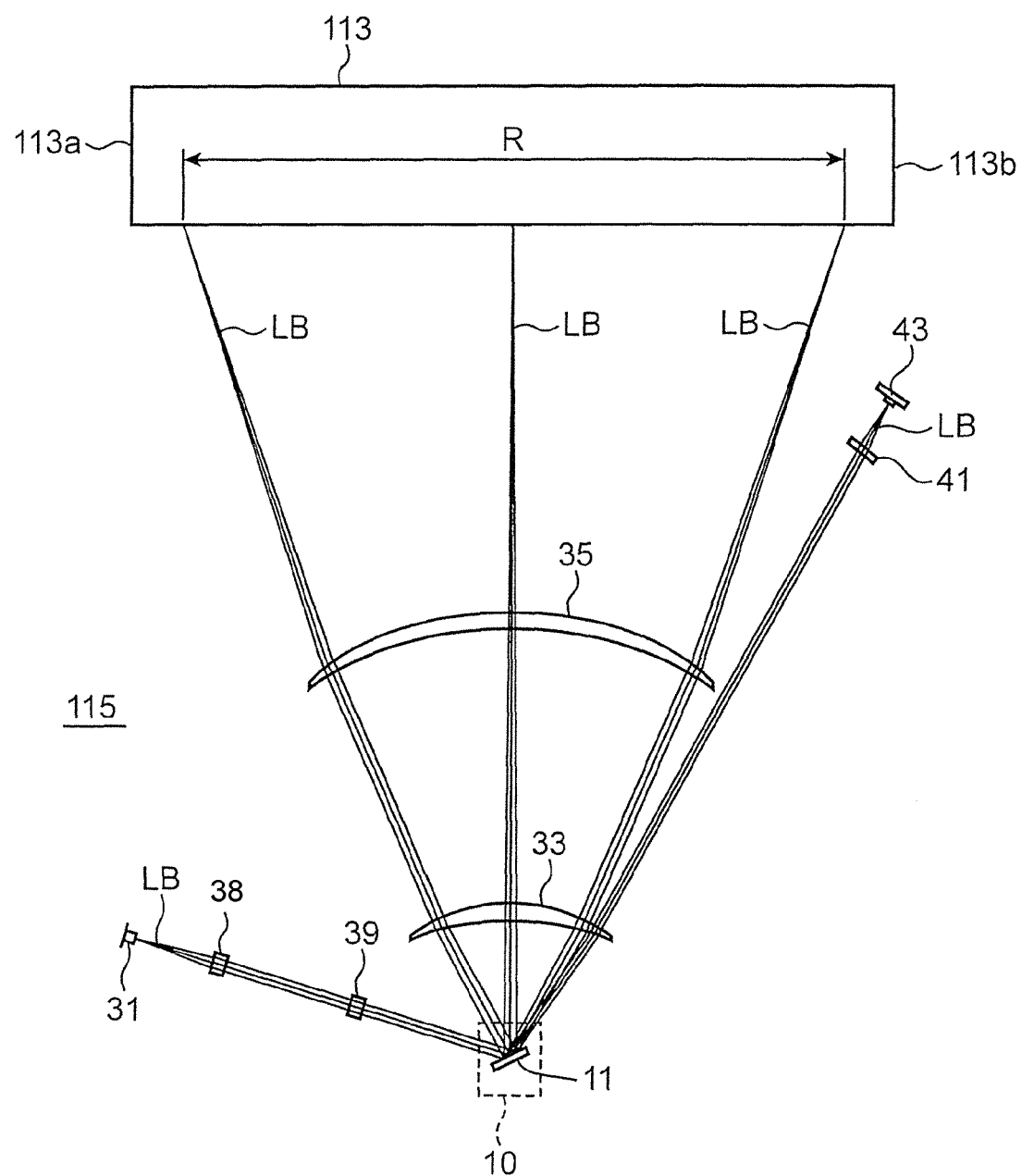
FIG. 3 is a diagram showing an arrangement relationship of optical components constituting an optical scanning device provided in the image forming apparatus shown in FIG. 1.

FIG. 3 is a diagram showing an arrangement relationship of optical components constituting the optical scanning device 115. The optical scanning device 115 includes a light source 31, a light deflector 10, two scanning lenses 33, 35 and the like. The light source 31 is, for example, a laser diode and emits a light beam LB modulated in accordance with image data.

A collimator lens 38 and a cylindrical lens 39 are arranged on an optical path between the light source 31 and the light deflector 10. The collimator lens 38 converts the light beam LB emitted from the light source 31 into a parallel beam. The cylindrical lens 39 linearly condenses the light beam LB converted into the parallel beam. The linearly condensed light beam LB is incident on the light deflector 10.

The scanning lenses 33, 35 are arranged on an optical path between the light deflector 10 and the photoconductive drum 113. The light beam LB incident on a mirror portion 11 of the light deflector 10 is reflected and deflected by the mirror portion 11 and focused on the photoconductive drum 113 by the scanning lenses 33, 35. That is, by scanning the light beam LB across the photoconductive drum 113, an electrostatic latent image is formed on the photoconductive drum 113.

The optical scanning device 115 further includes a BD lens 41 and a BD sensor 43. The light beam LB is scanned across the photoconductive drum 113 from one lateral part 113a to another lateral part 113b of the photoconductive drum 113, and the light beam LB beyond an effective scanning range is condensed by the BD lens 41 and received by the BD sensor 43. The BD (Beam Detect) sensor 43 generates a BD signal serving as a reference for the start of scanning (main scanning) on the photoconductive drum 113.

Figure 4:
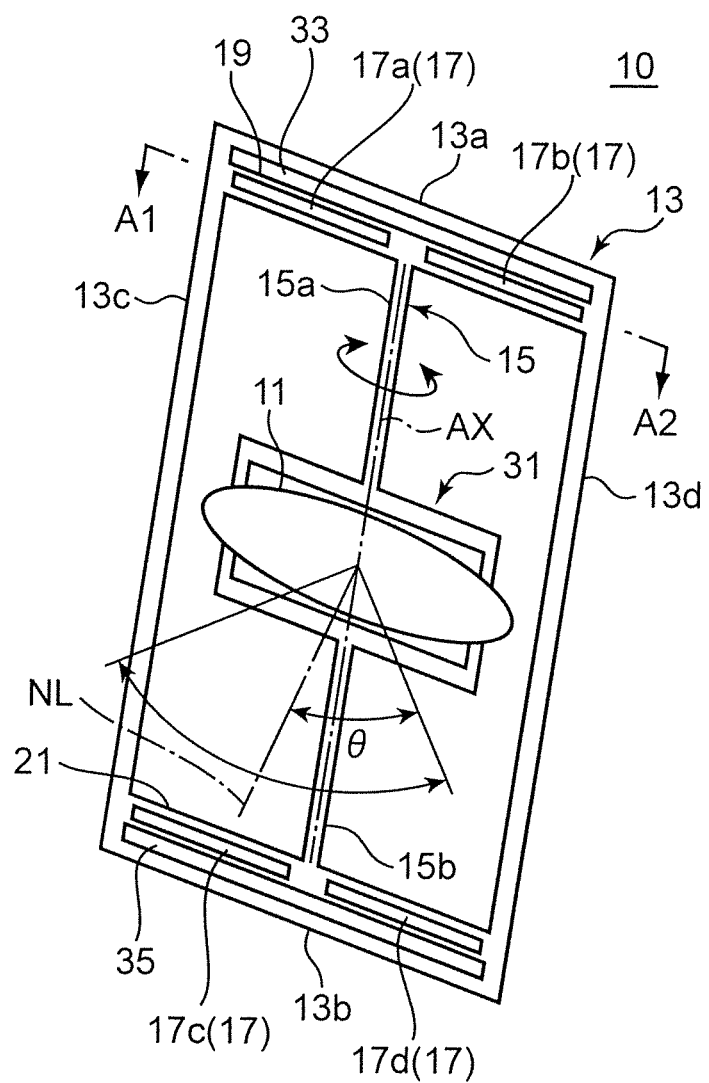
FIG. 4 is a perspective view of the light deflector according to the embodiment.
Figure 5:
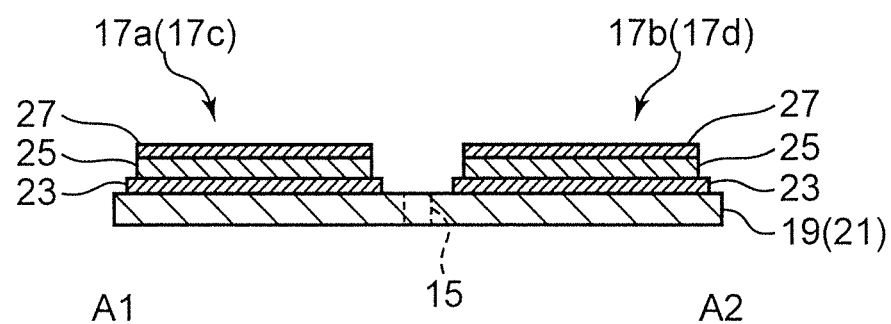
FIG. 5 is a sectional view cut along a line A1-A2 showing the light deflector shown in FIG. 4.

Next, the light deflector 10 according to this embodiment is described. FIG. 4 is a perspective view of the light deflector 10 according to the embodiment, and FIG. 5 is a sectional view cut along a line A1-A2 showing the light deflector shown in FIG. 4. The light deflector 10 according to this embodiment is a piezoelectrically driven MEMS mirror. However, the MEMS mirror usable as the light deflector 10 is not limited to the piezoelectrically driven one.

The light deflector 10 includes the mirror portion 11, a frame 13, a torsion bar 15, mirror drivers 17a, 17b, 17c and 17d, and a supporting body 31.

The frame 13 has a rectangular shape. The frame 13 is composed of a pair of side portions 13c, 13d extending in a longitudinal direction, a pair of side portions 13a, 13b extending in a direction perpendicular to the longitudinal direction, and beams 19, 21 (fixing portion) connecting the side portions 13c, 13d. The mirror portion 11 is arranged in a central part of the frame 13. The mirror portion 11 has an elliptical shape whose minor axis direction matches the longitudinal direction of the frame 13.

The torsion bar 15 has an axis extending in one direction and serving as a rotation axis (torsional rotation axis). The torsion bar 15 includes a first torsion bar 15a and a second torsion bar 15b extending along the common axis. The first and second torsion bars 15a, 15b extend in the minor axis direction of the elliptical shape of the mirror portion 11. One end of the first torsion bar 15a is fixed and supported by the beam 19 and one end of the second torsion bar 15b is fixed and supported by the beam 21.

A space 33 is formed between the beam 19 and the side portion 13a, and a space 35 is formed between the beam 21 and the side portion 13b.

The supporting body 31 supporting the mirror portion 11 is fixed to the other ends of the first and second torsion bars 15a, 15b. The supporting body 31 is arranged in the frame 13. The supporting body 31 has a rectangular shape and a longitudinal direction thereof is perpendicular to that of the frame 13. The beams 19, 21 (fixing portion) fix and support the torsion bar 15 in such a manner that the mirror portion 11 supported by the supporting body 31 is swingable about the axis of the torsion bar 15.

As described above, the mirror portion 11 deflects light by swinging about a predetermined swing axis, the torsion bar 15 is fixed and supported by the fixing portion (beams 19, 21) and has the axis AX serving as the swing axis, and the supporting body 31 supports the mirror portion 11 and is fixed to the torsion bar 15.

On the beam 19, the mirror driver 17a is formed on a side closer to the side portion 13c than the torsion bar 15 and the mirror driver 17b is formed on a side closer to the side portion 13d than the torsion bar 15. On the beam 21, the mirror driver 17c is formed on a side closer to the side portion 13c than the torsion bar 15 and the mirror driver 17d is formed on a side closer to the side portion 13d than the torsion bar 15.

As shown in FIG. 5, the mirror driver 17a is composed of a lower electrode 23, a PZT thin film 25 and an upper electrode 27. The mirror drivers 17b, 17c and 17d have the same configuration as the mirror driver 17a. The mirror drivers 17a, 17b, 17c and 17d are written as the mirror drivers 17 below unless it is necessary to distinguish them.

Figure 6:
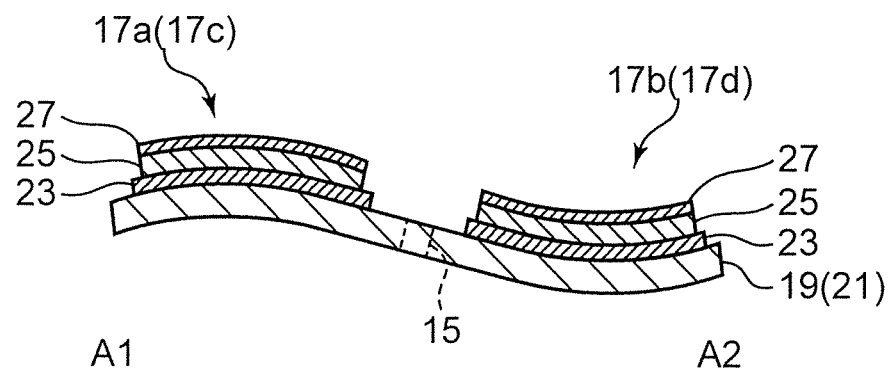
FIG. 6 is a view showing a state where a PZT thin film of a mirror driver on one side extends and that of a mirror driver on the other side contracts in the same cross-section as in FIG. 5.

FIG. 6 is a view showing a state where a drive voltage is applied to the mirror drivers 17 so that the PZT thin films 25 of the mirror drivers 17a, 17c extend and those of the mirror drivers 17b, 17d contract in the same cross-section as in FIG. 5. In FIG. 6, the beams 19, 21 are bended, whereby the mirror portion 11 is inclined together with the torsion bar 15.

The extension of the PZT thin films 25 of the mirror drivers 17a, 17c and the contraction of the PZT thin films 25 of the mirror drivers 17b, 17d are described as a first movement and the contraction of the PZT thin films 25 of the mirror drivers 17a, 17c and the extension of the PZT thin films 25 of the mirror drivers 17b, 17d are described as a second movement below. By applying a drive voltage to the mirror drivers 17 to deflect the beams 19, 21 so that the first and second movements are alternately repeated, the mirror portion 11 supported by the supporting body 31 swings about the axis of the torsion bar 15 to vary a deflection angle θ. Note that NL in FIG. 4 denotes a normal to the mirror portion 11 when the mirror portion 11 is not swinging.

When a frequency of the drive voltage is caused to match a resonant frequency, the mirror portion 11 resonates and a maximum value of the deflection angle θ (maximum deflection angle) can be increased. By reflecting and deflecting a light beam by the mirror portion 11 in a state where the mirror portion 11 is resonated, the light beam is scanned across the photoconductive drum 113.

Figure 7:
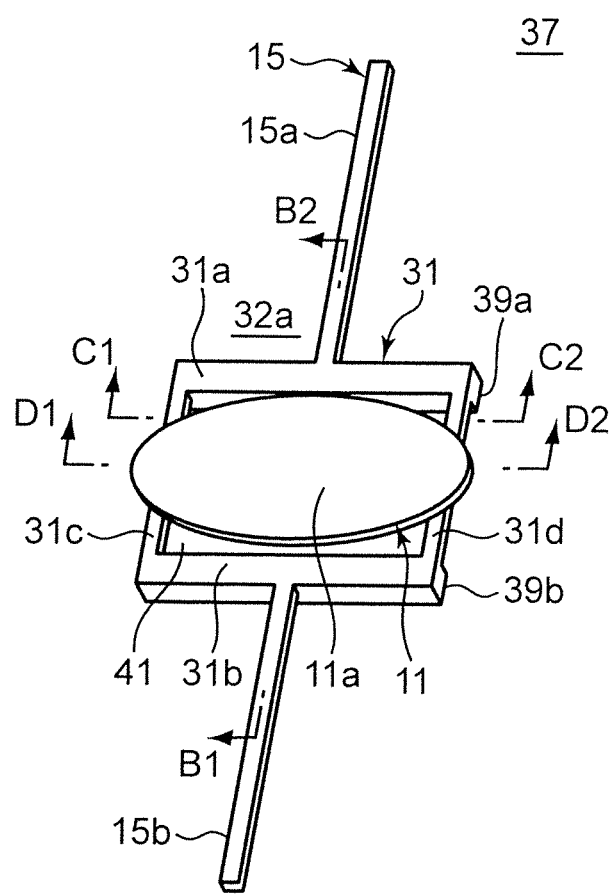
FIG. 7 is a perspective view showing a mirror portion, a torsion bar, a supporting body and a movable portion with a first rib and a second rib provided in the light deflector according to the embodiment when viewed from a top surface (light beam reflecting/deflecting surface) side of the mirror portion.
Figure 8:
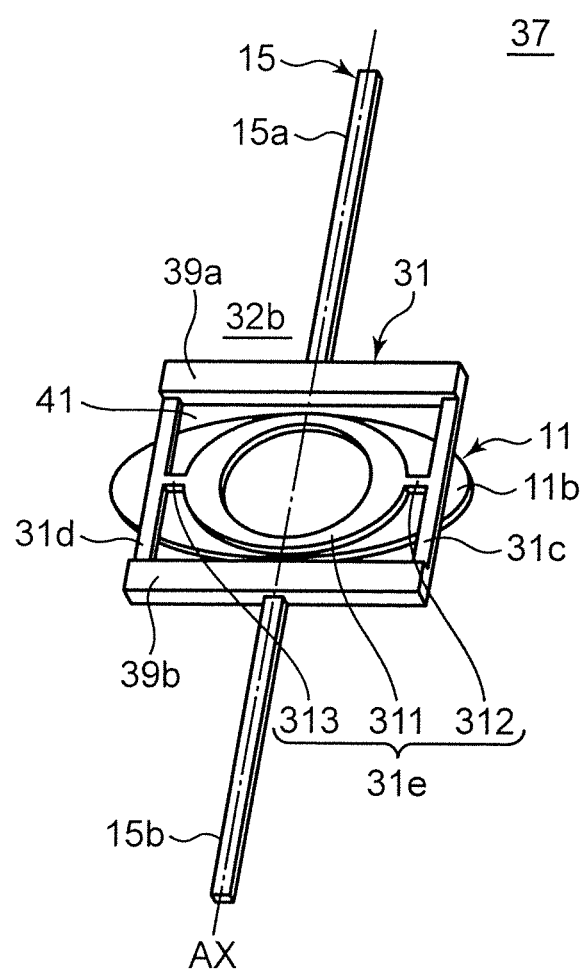
FIG. 8 is a perspective view of the movable portion viewed from an under surface side of the mirror portion.

FIG. 7 is a perspective view showing the mirror portion 11, the torsion bar 15, the supporting body 31 and a movable portion 37 with a first rib 39a and a second rib 39b provided in the light deflector 10 when viewed from the side of a top surface 11a (light beam reflecting/deflecting surface) of the mirror portion 11. FIG. 8 is a perspective view showing this movable portion 37 viewed from the side of an under surface 11b of the mirror portion 11.

The top surface 11a of the mirror portion 11 is on the side of one surface 32a of the supporting body 31, and the under surface 11b of the mirror portion 11 is supported by the one surface 32a of the supporting body 31.

The supporting body 31 has a rectangular frame-like shape and includes a first supporting member 31a, a second supporting member 31b, a third supporting member 31c and a fourth supporting member 31d which serve as four sides forming a rectangle.

The first and second supporting members 31a, 31b extend straight in a direction intersecting with an extending direction of the torsion bar 15 and are arranged to face each other.

The third and fourth supporting members 31c, 31d extend straight in the same direction as the extending direction of the torsion bar 15 and are symmetrically arranged with respect to the torsion bar 15.

A space 41 is defined by the first, second, third and fourth supporting members 31a, 31b, 31c and 31d. The supporting body 31 is made lighter by providing the space 41. However, the supporting body 31 may be in the form of a thin plate without including the space 41.

As described above, the supporting body 31 includes the first supporting member 31a extending in the direction intersecting with the torsion bar 15, the second supporting member 31b arranged to face the first supporting member 31a and extending in the direction intersecting with the torsion bar 15, the third supporting member 31c connecting the first and second supporting members 31a, 31b and the fourth supporting member 31d symmetrically arranged to the third supporting member 31c with respect to the axis of the torsion bar 15 and connecting the first and second supporting members 31a, 31b.

The supporting body 31 further includes a fifth supporting member 31e arranged in the space 41. The fifth supporting member 31e includes a main body portion 311, a first connecting portion 312 and a second connecting portion 313. The main body portion 311 is a main body of the fifth supporting member 31e and formed with a circular cavity. This makes the supporting body 31 lighter.

The first connecting portion 312 is arranged on a major axis of the main body portion 311 and connects one end part of the main body portion 311 and a center of the third supporting member 31c. The second connecting portion 313 is arranged on the major axis of the main body portion 311 and connects the other end part of the main body portion 311 and a center of the fourth supporting member 31d.

As described above, the torsion bar 15 is composed of the first and second torsion bars 15a, 15b. The first and second torsion bars 15a, 15b extend in the same direction and are arranged with a spacing provided therebetween. The supporting body 31 is arranged in an area including this spacing. The first torsion bar 15a is fixed to the first supporting member 31a in a center of the first supporting member 31a. The second torsion bar 15b is fixed to the second supporting member 31b in a center of the second supporting member 31b.

As shown in FIG. 7, each of the first, second, third, fourth and fifth supporting members 31a, 31b, 31c, 31d and 31e and the first and second torsion bars 15a, 15b includes a planar portion facing toward the side of the one surface 32a of the supporting body 31, and each planar portion is located on the same plane. These have the same height (i.e. same thickness).

The mirror portion 11 is provided on the one surface 32a of the supporting body 31. The mirror portion 11 is bonded to the third, fourth and fifth supporting members 31c, 31d and 31e using an adhesive or joined to the third, fourth and fifth supporting members 31c, 31d and 31e by anode junction.

The first rib 39a (reinforcing member) and the second rib 39b (reinforcing member), which are ribs extending in the direction intersecting with the torsion bar 15, are provided on the other surface 32b of the supporting body 31. The first rib 39a is provided on the first supporting member 31a and the second rib 39b is provided on the second supporting member 31b.

Figure 9:
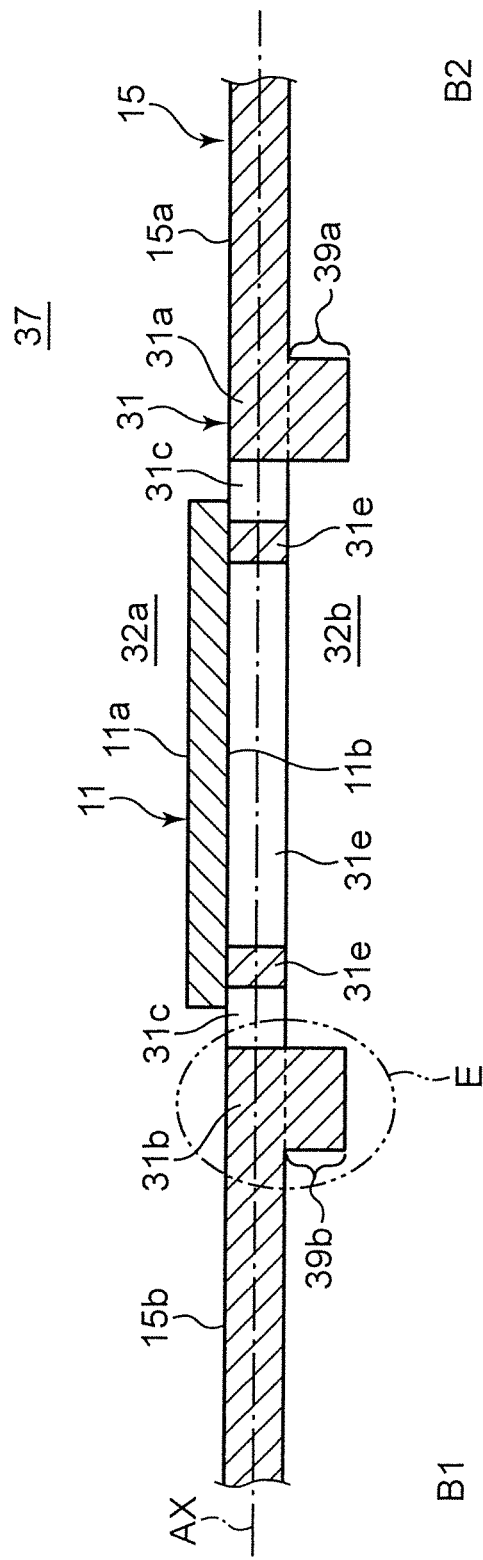
FIG. 9 is an enlarged sectional view cut along a line B1-B2 showing the movable portion shown in FIG. 7.
Figure 10:
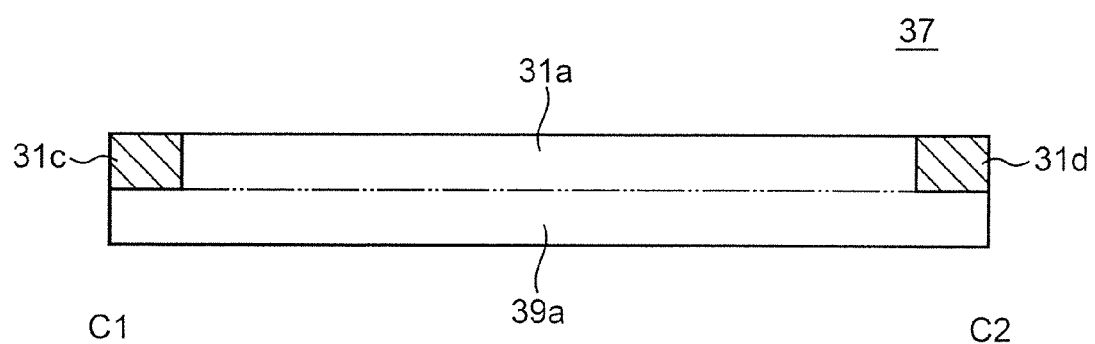
FIG. 10 is an enlarged sectional view cut along a line C1-C2 showing the movable portion shown in FIG. 7.
Figure 11:
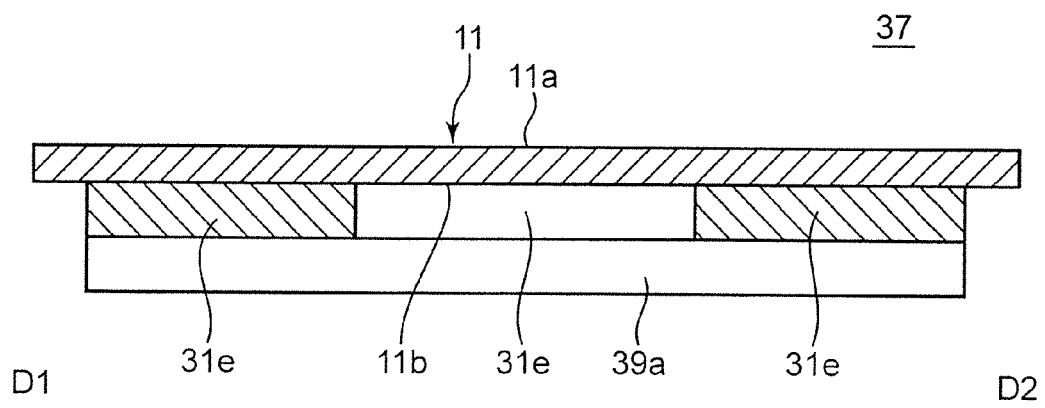
FIG. 11 is an enlarged sectional view cut along a line D1-D2 showing the movable portion shown in FIG. 7.

The first and second ribs 39a, 39b are described in detail. FIG. 9 is an enlarged sectional view cut along a line B1-B2 showing the movable portion 37 shown in FIG. 7. FIG. 10 is an enlarged sectional view cut along a line C1-C2 showing the movable portion 37 shown in FIG. 7. FIG. 11 is an enlarged sectional view cut along a line D1-D2 showing the movable portion 37 shown in FIG. 7.

With reference to FIGS. 7 to 11, the supporting members 31 (first, second, third, fourth and fifth supporting members 31a, 31b, 31c, 31d and 31e) and the torsion bar 15 (first and second torsion bars 15a, 15b) have the same thickness. As show in FIG. 9, the first rib 39a is a part formed to be continuous with the first supporting member 31a and projecting from the supporting body 31 on the other surface 32b of the supporting body 31. The second rib 39b is a part formed to be continuous with the second supporting member 31b and projecting from the supporting body 31 on the other surface 32b of the supporting body 31.

In other words, the supporting body 31 includes a contact surface (one surface 32a) to be held in contact with the mirror portion 11 and a non-contact surface (other surface 32b) opposite to the contact surface. The first rib 39a is so provided on the first supporting member 31a as to extend in the direction intersecting with the torsion bar 15 and project on the non-contact surface side. The second rib 39b is so provided on the second supporting member 31b as to extend in the direction intersecting with the torsion bar 15 and project on the non-contact surface side.

The first and second supporting members 31a, 31b and the first and second ribs 39a, 39b have the same length. Further, these have the same width. A mass of the first rib 39a and that of the second rib 39b are equal. A total mass of the first and second ribs 39a, 39b is equal to a mass of the mirror portion 11.

Figure 12:
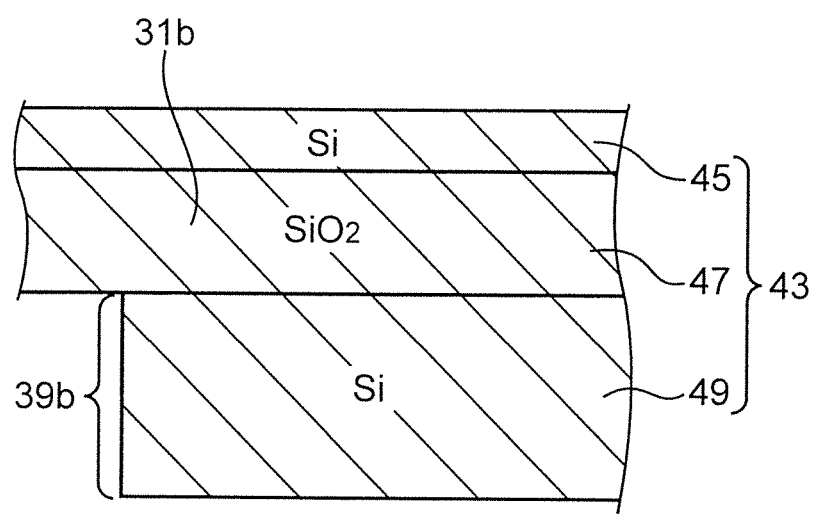
FIG. 12 is a sectional view enlargedly showing a part indicated by E in FIG. 9.

FIG. 12 is a sectional view enlargedly showing a part indicated by E in FIG. 9. An SOI (Silicon on Insulator) substrate 43 is structured such that a silicon oxide film 47 is sandwiched between silicon layers 45 and 49. The supporting body 31 and the torsion bar 15 are formed by the silicon layer 45 and the silicon oxide film 47. The first and second ribs 39a, 39b are formed by the silicon layer 49. The torsion bar 15, the supporting body 31 and the first and second ribs 39a, 39b are formed by selectively etching the SOI substrate 43.

Note that the first and second ribs 39a, 39b may be respectively bonded to the first and second supporting members 31a, 31b by an adhesive or joined thereto by anode junction.

The first and second ribs 39a, 39b are provided only on the other surface 32b out of the one surface 32a (contact surface to be held in contact with the mirror portion 11) and the other surface 32b (non-contact surface opposite to the contact surface) of the supporting body 31 and function as reinforcing members for reinforcing the supporting body 31 and adjusting a center of gravity of the movable portion 37 including the torsion bar 15, the supporting body 31 and the mirror portion 11 so that the center of gravity of the movable portion 37 is located on the axis AX.

Main effects of this embodiment are described. With reference to FIGS. 7 and 8, the first supporting member 31a is fixed to the torsion bar 15a in the center thereof. Thus, a moment of inertia acting on the first supporting member 31a when the mirror portion 11 is swung about the axis AX of the torsion bar 15 increases with distance from the first torsion bar 15a. Similarly, since the second supporting member 31b is fixed to the torsion bar 15b in the center thereof, a moment of inertia acting on the second supporting member 31b when the mirror portion 11 is swung about the axis AX of the torsion bar 15 increases with distance from the second torsion bar 15b.

Contrary to this, the extending directions of the third and fourth supporting members 31c, 31d are the same as that of the torsion bar 15. Thus, the first and second supporting members 31a, 31b are more easily bended than the third and fourth supporting members 31c, 31d when the mirror portion 11 is swung. The supporting body 31 is bended if the first and second supporting members 31a, 31b are bended, with the result that the mirror portion 11 is bended.

If ribs are provided on all the first, second, third and fourth supporting members 31a, 31b, 31c and 31d to suppress the bend of the mirror portion 11, a mass of the supporting body 31 increases.

Accordingly, in this embodiment, the first rib 39a extending in the direction intersecting with the torsion bar 15 is provided on the first supporting member 31a extending in the direction intersecting with the torsion bar 15 and the second rib 39b extending in the direction intersecting with the torsion bar 15 is provided on the second supporting member 31b extending in the direction intersecting with the torsion bar 15.

By the above, according to this embodiment, the bend of the mirror portion 11 when the mirror portion 11 is swung can be suppressed while the supporting body 31 is made lighter.

The mirror portion 11 is mounted on the third, fourth and fifth supporting members 31c, 31d and 31e without being mounted on the first and second supporting members 31a, 31b. Thus, even if the first and second supporting members 31a, 31b are bended a little, such bend is not directly transmitted to the mirror portion 11. Therefore, the bend of the mirror portion 11 can be reduced.

According to this embodiment, the mirror portion 11 is provided on the one surface 32a (contact surface to be held in contact with the mirror portion 11) of the supporting body 31, the first and second ribs 39a, 39b are provided on the other surface 32b (non-contact surface opposite to the contact surface), and the total mass of the first and second ribs 39a, 39b is equal to the mass of the mirror portion 11. Since this makes a mass on the side of the one surface 32a of the supporting body 31 and that on the side of the other surface 32b equal, the center of gravity of the movable portion 37 configured by the torsion bar 15 and the like can be so adjusted as to be located on the axis AX of the torsion bar 15. Therefore, the moment of inertia can be balanced between the side of the one surface 32a of the supporting body 31 and the side of the other surface 32b.

Specifically, as shown in FIG. 9, the center of gravity of the movable portion 37 configured by the mirror portion 11, the supporting body 31, the first rib 39a, the second rib 39b, the first torsion bar 15a and the second torsion bar 15b can be located on the axis AX as center axes of the first and second torsion bars 15a, 15b. Thus, when the mirror portion 11 is swung about the axis AX of the torsion bar 15, movements of the mirror portion 11 other than swinging movements about the axis AX of the torsion bar 15 can be suppressed.

The same mass mentioned here means that the total mass of the first and second ribs 39a, 39b is completely or substantially equal to the mass of the mirror portion 11. To be substantially equal means that a difference between the total mass and the mass of the mirror portion 11 is in a range capable of suppressing movements of the mirror portion 11 other than swinging movements about the axis AX of the torsion bar 15 when the mirror portion 11 is swung about the axis AX of the torsion bar 15.

Further, according to this embodiment, the ribs (first rib 39a, second rib 39b) are provided on the other surface 32b (non-contact surface) of the supporting body 31, but not on the one surface 32a (contact surface) as shown in FIGS. 7 and 8. As shown in FIGS. 7 and 8, the surfaces of the first, second, third, fourth and fifth supporting members 31a, 31b, 31c, 31d and 31e and the first and second torsion bars 15a, 15b are located on the same plane on the side of the one surface 32a of the supporting body 31. Thus, it is not necessary to etch both surfaces of the SOI substrate 43 and ribs can be formed by selectively etching one surface, wherefore the number of manufacturing steps of the light deflector 10 can be reduced. Hence, the cost of the light deflector 10 can be reduced.

As shown in FIG. 12, the supporting body 31 and the torsion bar 15 are formed by the silicon layer 45 and the silicon oxide film 47 of the SOI substrate 43. The first and second ribs 39a, 39b are formed by the silicon layer 49 of the SOI substrate 43. Thus, the thickness of the first rib 39a and that of the second rib 39b can be set at that of the silicon layer 49, wherefore the accuracy of the thickness of the first rib 39a and that of the second rib 39b (i.e. the accuracy of the total mass of the first and second ribs 39a, 39b) can be enhanced.

With reference to FIG. 9, the rigidity of the first torsion bar 15a becomes higher, for example, if the thickness of the first torsion bar 15a is set at a total value of the thickness of the first supporting member 31a and that of the first rib 39a. Similarly, the rigidity of the second torsion bar 15b becomes higher, for example, if the thickness of the second torsion bar 15b is set at a total value of the thickness of the second supporting member 31b and that of the second rib 39b. In this way, a swinging angle (i.e. the maximum value of the deflection angle θ shown in FIG. 4) of the mirror portion 11 becomes smaller.

Accordingly, in this embodiment, the thickness of the first torsion bar 15a is made smaller than the total value of the thickness of the first supporting member 31a and that of the first rib 39a, and the thickness of the second torsion bar 15b is made smaller than the total value of the thickness of the second supporting member 31b and that of the second rib 39b. In this way, the swinging angle of the mirror portion 11 is made larger.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:
1. A light deflector, comprising:
a fixing portion; and
a movable portion including a mirror portion for deflecting light by swinging about a predetermined swing axis, first and second torsion bars fixedly supported on the fixing portion and having an axis serving as the swing axis, and a supporting body configured to support the mirror portion and fixed to the torsion bars;
wherein:
the supporting body includes a contact surface to be held in contact with the mirror portion and a non-contact surface opposite to the contact surface, the supporting body further includes a first supporting member extending in a direction intersecting with the first torsion bar, a second supporting member arranged to face the first supporting member and extending in a direction intersecting with the second torsion bar, a third supporting member connecting the first and second supporting members, a fourth supporting member arranged symmetrically to the third supporting member with respect to the torsion bar and connecting the first and second supporting members, and a space defined by the first, second, third and fourth supporting members, the first torsion bar being fixed to the first supporting member in a center of the first supporting member and the second torsion bar being fixed to the second supporting member in a center of the second supporting member; and
the light deflector further comprises a reinforcing member provided only on the non-contact surface out of the contact surface and the non-contact surface of the supporting body and configured to reinforce the supporting body and adjust a center of gravity of the movable portion so that the center of gravity of the movable portion is located on the axis, the reinforcing member including a first rib extending in a direction intersecting with the first torsion bar and projecting from the non-contact surface side of the first supporting member and a second rib extending in a direction intersecting with the second torsion bar and projecting from the non-contact surface side of the second supporting member.

2. A light deflector according to claim 1, wherein:
a mass of the reinforcing member is equal to that of the mirror portion.

3. A light deflector according to claim 1, wherein:
a thickness of the first torsion bar is smaller than a total value of a thickness of the first supporting member and that of the first rib; and
a thickness of the second torsion bar is smaller than a total value of a thickness of the second supporting member and that of the second rib.

4. A light deflector according to claim 3, wherein:
each of the first, second, third and fourth supporting members and the first and second torsion bars includes a planar portion facing toward the side of the contact surface and each planar portion is located on the same plane.

5. A light deflector according to claim 4, wherein:
the supporting body, the first and second torsion bars, the first and second ribs are formed by processing a substrate including a first silicon layer, a second silicon layer and a silicon oxide film sandwiched between the first and second silicon layers;
the supporting body and the first and second torsion bars are formed by the first silicon layer and the silicon oxide film; and
the first and second ribs are formed by the second silicon layer.

6. A light deflector according to claim 5, further comprising a mirror driver for generating a drive force for swinging the mirror portion supported by the supporting body about the axis of the torsion bar using a piezoelectric element.

7. An optical scanning device, comprising:
a light deflector according to claim 1; and
a light source configured to irradiate a light beam to the mirror portion.

8. An image forming apparatus, comprising:
an image bearing member;
an optical scanning device according to claim 7 configured to form an electrostatic latent image of an image represented by image data on the image bearing member; and
a developing unit configured to develop the electrostatic latent image formed on the image bearing member.

* * * * *